(12) United States Patent
Sanchis Brines et al.

(10) Patent No.: US 9,227,882 B2
(45) Date of Patent: Jan. 5, 2016

(54) REINFORCED NATURAL OR CONGLOMERATED STONE PLATE-LIKE ELEMENT AND MULTILAYERED PROTECTIVE COATING THEREOF

(75) Inventors: Francisco Antonio Sanchis Brines, Valencia (ES); Erik Schoneveld, Marxuquera (ES)

(73) Assignee: Silicalia, SL (ES)

( * ) Notice: Subject to any disclaimer, the term of this patent is extended or adjusted under 35 U.S.C. 154(b) by 880 days.

(21) Appl. No.: 13/145,294

(22) PCT Filed: Jan. 29, 2010

(86) PCT No.: PCT/IB2010/000152
§ 371 (c)(1),
(2), (4) Date: Aug. 2, 2011

(87) PCT Pub. No.: WO2010/086713
PCT Pub. Date: Aug. 5, 2010

(65) Prior Publication Data
US 2011/0281087 A1  Nov. 17, 2011

(30) Foreign Application Priority Data
Jan. 30, 2009  (EP) ..................................... 09380014

(51) Int. Cl.
*B32B 3/10* (2006.01)
*C04B 41/52* (2006.01)
*C04B 41/00* (2006.01)
*C04B 111/20* (2006.01)

(52) U.S. Cl.
CPC .............. *C04B 41/52* (2013.01); *C04B 41/009* (2013.01); *C04B 2111/2038* (2013.01); *Y10T 428/24802* (2015.01); *Y10T 428/24868* (2015.01); *Y10T 428/24876* (2015.01); *Y10T 428/24893* (2015.01); *Y10T 428/24975* (2015.01); *Y10T 428/266* (2015.01); *Y10T 428/31511* (2015.04); *Y10T 428/31786* (2015.04); *Y10T 428/31855* (2015.04)

(58) Field of Classification Search
USPC ........................................................ 428/195.1
See application file for complete search history.

(56) References Cited

U.S. PATENT DOCUMENTS

| 5,431,962 A | 7/1995 | Glass et al. | |
| 7,931,954 B2 * | 4/2011 | Kobayashi et al. | ......... 428/195.1 |
| 2008/0063844 A1 * | 3/2008 | Chen et al. | .................... 428/208 |

FOREIGN PATENT DOCUMENTS

| DE | 102004023153 A1 * | 12/2005 |
| WO | WO 2005030486 A1 * | 4/2005 |

OTHER PUBLICATIONS http://web.archive.org/web/20090825093021/http://www.stonesurfacesinc.net/EcoTerr_Colors.php Retreived Mar. 11, 2014.*

(Continued)

*Primary Examiner* — Gerard Higgins
*Assistant Examiner* — Christopher Polley
(74) *Attorney, Agent, or Firm* — Hess Patent Law Firm LLC; Robert J. Hess

(57) ABSTRACT

Reinforced natural or conglomerate stone plate-like element and multilayered protective coating that includes a substrate of natural or conglomerated stone material and a multi-layered coating providing protection of the substrate against chemical and wearing mechanical agents acting on the element. The multi-layered coating includes three single or multiple film forming composition layers.

17 Claims, 1 Drawing Sheet

(56) References Cited

OTHER PUBLICATIONS

Translation of DE 10 2004 023 153.*

Chemical Abstracts, vol. 106, No. 18, May 4, 1987, Columbus, Ohio, US; abstract No. 143073u, XP000186278 & JP 61 286281 A (Washi Chuetsu Board KK) Dec. 16, 1986.

* cited by examiner

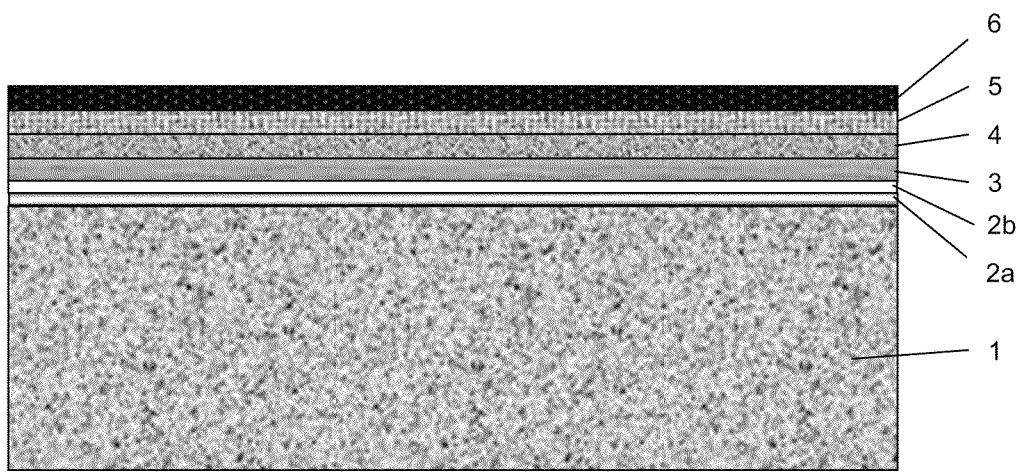

REINFORCED NATURAL OR CONGLOMERATED STONE PLATE-LIKE ELEMENT AND MULTILAYERED PROTECTIVE COATING THEREOF

FIELD OF INVENTION

The present invention relates to natural or conglomerated stone plate-like elements, in particular flat elements as a tile board or slab comprising as a substrate marble or other calcium carbonate based stone type.

On a first general aspect of this invention the wear and or chemical resistance of the referred natural or conglomerated stone plate-like elements is significantly improved by means of a particular protective coating comprising several on purpose protective layers superimposed to the face showing or surface of the element when this later being set up, used as a covering of a building or structural surface. This multilayered protective coat of the stone element protects the substrate against scratch, wear and mechanical impact as well as against external chemical agents that can affect the substrate structure. The protective coating applied allow also to use as a substrate a relative thin plate of natural or conglomerated stone, in particular marble, including in a great proportion recycled particles.

In an embodiment of the invention a natural or conglomerated stone tile or slab is provided including at their in face showing a finish protected by said superimposed protective layers that in spite of a protective function allow a good visualization of said finish. The finish can adopt any design pattern in particular a true wood appearance.

BACKGROUND ART

Natural and conglomerated stone elements are widely used in the construction industry, with applications varying from flooring and wall panelling to kitchen and counter-tops etc. One of the major flaws of some natural- and conglomerated flat stone elements, especially those comprising marble or other calcium carbonate based stone types, is their relative low resistance to scratch, wear, chemical attack and UV attack.

Many proposals have been made to protect natural and agglomerated stone plate-like elements.

DE-A-102004023153, proposes a method of applying a protective layer of boron silica glass adhered via adhesive layer to a surface or base of a natural or cast stone structural member. This invention provides a solution for both wear as chemical resistance of natural or cast stone surfaces, but the solution to apply a thin layer of boron silica glass is significantly different from the solution provided in the proposed invention and does not provide similar benefits.

U.S. Pat. No. 6,205,727 proposes the application of a reinforcing layer to the visible face of slabs of stone material. For slabs of marble and granite, especially thin slabs, the reinforcing layer is constituted by non-twisted glass threads, preferably in the form of a mat, and by a transparent resin resistant to the action of atmospheric and chemical agents. A reinforced slab is obtained which has a small thickness and in which the resistance to negative flexing is greatly increased, along a front face concomitantly with the resistance to positive flexing along the rear, or invisible, face of the slab when the rear face is also reinforced. This invention also mentions the use of extremely fine glass of quartz powder in order to increase the scratch or abrasion resistance. Epoxy and or acrylic resins supplemented with UV ray absorbers and or so called UV ray scavengers are mentioned to increase the UV resistance of the finished product.

Wear resistant surface protection layers are widely used in the laminating industry, we can mention among others U.S. Pat. Nos. 3,663,341, 3,756,901, 4,255,480, DE-A-2107091. US-A-2008/0014343 describes an enhanced scratch resistance of articles such as wood-based articles or a surface of an automobile, including a nano-particle-based additive and discloses a film forming composition comprising a resin, a plurality of nanoparticles, a surface active material and a polymeric dispersant.

U.S. Pat. No. 6,955,834 refers to a long lasting coating for modifying hard surfaces and processes for applying the same and discloses a material for coating a hard surface said coating material comprising an effective amount of non-photoactive nanoparticles. While application of referred coating is disclosed to be suitable for stone surfaces including granite, marble, sandstone, etc., the invention mainly refers and claims an automobile body panel.

U.S. Pat. No. 6,896,958, discloses a transparent film-forming composition containing surface treated nanocristalline particles dispersed in a cross-linkable resin, providing a substantially transparent abrasion-resistant coating formed on a substrate such as with floor and countertop coverings and automotive panel.

In EP-B-1122334 a method of forming a coated body having a layer of $Al_2O_3$ is disclosed. The coating is performed by chemical vapour deposition under higher temperature and controlled atmosphere.

EP-1160283 provides a composition for use in forming an abrasion-resistant easy to clean coating on a substrate comprising a mixture of a fluorocarbon polymer component and an enamel-forming component, said enamel-forming component comprising by weight from about 15% to about 30% of $Al_2O_3$. The coating is applied mainly to a vehicle panel but use for covering ceramics and stone is also disclosed.

U.S. Pat. No. 6,896,934 concerning hybrid coating compositions refers as a conventional practice to avoid the problems to obtain a non-stick polymeric coating that adhere well to substrates such as ceramics, to apply one or more base coats containing adhesive resins in order to better adhere fluorocarbon polymer top coats to substrates. As in this antecedent in the present invention the term base coat and primer coat will be understood as having this particular meaning.

U.S. Pat. No. 5,431,962, JP61286281 and DDA3223043 disclose concrete substrates provided with a multilayered coating to protect the substrate from abrasion.

This invention provides a natural or conglomerated stone plate-like element, in particular a flat element as a tile or slab with a protective multilayered coating specially created to appropriate reinforce and protect a petrous substrate that therefore can be thinner than other plate-like elements already known in the field. Moreover the invention also offers a conglomerated stone plate-like element with a finishing in particular a wood one on an in face showing that remains sheltered by referred multilayered protective coating.

DESCRIPTION OF THE INVENTION

The current invention provides a solution for improving both wear as chemical resistance of natural or conglomerated stone plate-like element, by applying one or several protective layers to the natural or conglomerated stone surface and, also conferring impact resistance thereto, thus providing a plate-like element, such as a tile slab or large board which can be installed on areas included in non friendly environments, referring to aggressive agents, and where it has to bear different kinds of impacts, such as those caused by people stepping there on, if said element is installed over a floor.

Accordingly the present invention provides a reinforced natural or conglomerate stone plate-like element comprising:
- a substrate of natural or conglomerate stone material; and
- a multi-layered coating providing protection of said substrate against chemical and several wearing mechanical agents that could act on the element;

As per the proposal of this invention said multi-layered coating comprises three or more single or multiple film forming composition layers including:
- an upper layer providing scratch protection;
- a cushioning intermediate layer providing impact resistance; and
- a lower layer adjacent to said substrate providing abrasion resistance.

For an embodiment said upper layer includes scratch resistant nanoparticles embedded in a resin selected among polyester-, melamine-, phenolic, acrylic- and epoxy-resins or a combination of each of them; and said lower layer providing abrasion resistance includes Al2O3, or silicon carbide particles and the like, plus an acrylic polymer.

For another embodiment the protection multi-layered coating also increases the resistance against specific chemicals, such as acids.

For another embodiment the multi-layered coating also includes UV protection, for which purpose they are formed by resin with UV stabilisers and/or anti oxidant components.

Referring to said scratch resistant nanoparticles, the upper layer it comprises, for a preferred embodiment, SiC, BN, B4N, alumina, or a combination thereof.

Said cushioning intermediate layer is made of epoxy and/or acrylic resin for an embodiment of the element provided by the invention.

In order to enhance adhesion between said substrate and said multi-layered coating, the element provided by the invention comprises a primer coating placed among them.

The multi-layered coating is generally transparent or translucent in order to allow a good visualization of the face showing of the substrate (in which case said primer coating, if used, is also transparent or translucent), or enabling to perceive a design pattern placed there on, depending on the embodiment.

Relating to said embodiment, the element provided by the invention comprises, between said primer coating and said multi-layered coating, a finish or printing layer adopting a design pattern, viewable from outside thanks to said transparency or translucency of the multi-layered coating.

Depending on the colour or colours of said design pattern, the element provided by the invention comprises, between said primer coating and said printing layer a basecoat formed by one or more painting layer with a background colour (generally white) for setting off said design pattern, which, for an embodiment, has a true wood appearance.

Said printing layer is, generally, a painting layer of at least a colour different from the colour of said substrate or of said basecoat painting layer, if used.

Said painting layers are formed, for an embodiment, by heat dried waterborne paint.

Referring to the manner said layers have been obtained, for an embodiment they are applied by deposition on said substrate for example by rollers and then curing.

Depending on the application the element provided has between five and twelve layers or films, where each of said layers or films is of 20-30 g/m² and of 10-30 microns, being considered by the present inventors, according to experimental tests, a thickness for obtaining a good performance for the whole group of layers should be of less than 150 microns.

As an option and in order to improve the adherence of said layers, which are made of resin, to said substrate surface, in the element provided by the invention the substrate surface on which said multilayered coating is placed, has suffered a corona treatment.

For some embodiments said substrate is a recycled material (such as sludge) conglomerate cast stone having a thickness comprised between 6 and 30 mm. Some embodiments can include one or several recycled materials conglomerated with an organic or inorganic binder for example cast stone.

For a preferred embodiment the present invention provides a slab or a tile, whether constituted by the element itself, or by cutting a board into smaller pieces if the element provided by the invention is a board. The invention mainly when the substrate is a conglomerate one also allows providing extensive boards to cover a large area.

BRIEF DESCRIPTION OF THE DRAWINGS

The previous and other advantages and features will best be understood by reference to the following detailed description of illustrative and not limitative embodiments when read in conjunction with the accompanying drawing, wherein:

FIG. 1 is a cross sectional side view of the element provided by the present invention, for an embodiment.

DETAILED DESCRIPTION OF THE INVENTION

FIG. 1 gives a detailed image of the current invention, in which a reinforced natural or conglomerate stone plate-like element comprises:
- a substrate 1 of natural or conglomerate stone material;
- a substantially transparent or translucent multi-layered coating providing protection of said substrate 1 against chemical and wearing mechanical agents that could act on the element;

Said multi-layered coating comprises, for the illustrated embodiment, three single film forming composition layers including:
- an upper layer 6 providing scratch protection;
- a cushioning intermediate layer 5 providing impact resistance; and
- a lower layer 4 adjacent said substrate 1 providing abrasion resistance.

The element of FIG. 1 also comprises, between said substrate 1 and said multi-layered coating, a primer coating 2a for enhancing adhesion among them, over which there is a finish or printing layer 3 adopting a design pattern, which in this case has a true wood appearance.

Between said primer coating 2a and said printing layer 3 there is a white basecoat 2b for setting off said design pattern.

The embodiment illustrated in FIG. 1 shows a substrate 1 of un-attractive natural- or conglomerated stone surface, for example obtained from recycled stone material in which case the in surface showing is changed to a to an aesthetically attractive surface by including the mentioned printing layer 3.

That's the case, for example, of a substrate 1 formed by a recycled sludge conglomerated cast stone. Said substrate can also be slight this allowing its handling This may provide an environmentally friendly and economically viable solution to the reutilisation of currently generated sludge and other waste materials from the conglomerated stone production process, avoiding or reducing significantly the waste disposal of such waste materials.

For other embodiments, not shown, where the substrate by itself has a good aesthetical appearance, said printing layer 3 and said basecoat 2b are not used. Thanks to the transparent nature of the resin/wear protective particle multi-layered coating 4, 5, 6, the visual appearance of the natural- or conglomerated stone surface is not or hardly affected. Therefore the product can be marketed as a classical natural- or conglomerated stone, but with improved product performance.

One weak point of some natural- and most resin bound agglomerated stone materials, is the low resistance to weathering and more specifically resistance to UV light resulting in quality degradation over time. By ways of incorporating UV stabilisers and or anti-oxidants in the surface protection layer, this resistance to UV light can be improved. Thanks to the fact that these UV stabilisers will be used in the thin surface protection layer of the natural or agglomerated stone element, relatively high concentrations of UV stabilisers can be used, without causing an unreasonable cost increase to the final product. For example in resin bound conglomerated stone elements, in order to protect the resin sufficiently from UV degradation, relatively high concentrations of UV stabilisers have to be used. As the resin is used all through the agglomerated stone matrix, this implies a significant cost increase to the final product. Nevertheless by applying these UV stabilisers only to the surface protection layer, this cost increase will be significantly lower.

The current invention distinguishes itself from former inventions in the following two ways. Compared to the existing invention applied to natural- and agglomerated stone elements, none of the disclosed solutions provides a wear resistance (against scratch and abrasion) as well against impacts, in the way that has been proposed in the current invention, namely by applying a protection multi-layered coating with an upper layer 6 existing from highly wear resistant $Al_2O_3$ particles agglomerated into a resin binder. On the other hand the existing solutions for wear and chemical protection using highly wear resistant $Al_2O_3$ particles embedded in resin mixtures are only forecast and used for laminating and or conglomerated wood applications, which are significantly different in properties as natural- stone and conglomerated stone materials.

One of the major differences of providing protective surface layers to a conglomerated stone instead of laminate or wood based materials is the fact that the molecular structure differs significantly, and therefore it is more complicated to adhere the surface protection layer to the conglomerated stone material. In order to improve the adhesion between the resin based protective multi-layered coating 4, 5, 6 to the natural- and agglomerated stone surface of the substrate 1, different kinds of surface treatments can be used. For example using a Corona treatment, the surface energy of the conglomerated stone surface can be increased. This will increase the polarity of the conglomerated stone surface, and thus polar resins will adhere better.

Experimental Part

Several tests have been conducted in order to reach a significant improvement of the surface of natural/conglomerated stone above described. First commercial non coloured overlay papers including corundum particles, were applied to marble based composite stones, using different kinds of resins. Applying the overlay paper manually to the polished surface of the composite marble stone with ortophtalic polyester did not give the desired result as by using small amounts of resin the overlay paper did not reach a transparent look. On the other hand when more resin was applied to the test sample until a transparent look was obtained, the upper surface of the test piece was fully covered with polyester resin, leading to a decreased scratch resistance and surface hardness as the original marble composite stone. The tests were repeated with different kinds of resins like acrylic and epoxy resins, but the result did not improve at all.

Tests were conducted to repeat the process in a double belt press, in order to improve the result of the transparency. Nevertheless the tests were not successful, as at low pressures of the double belt (<10 Bars) the overlay material did not stick well to the surface, and at high pressures (>10 Bars) the marble composite material did not resist the high pressure and breaks.

Due to the bad test results using overlay papers, a new concept was tested mixing high abrasive particles like quartz powder with different kinds of resins in different kinds of proportions. Applying 5 weight % of quartz powder to a polyester resin matrix, to the surface of the marble composite stone, results in a fully transparent protection lacker. Nevertheless due to the low amount of quartz filler, the surface properties (<3 on the scale of Mohs) did not improve compared to the original piece of marble composite, which has a surface hardness of 2-3 on the scale of Mohs. When the quartz powder concentration was increased to 50%, the Mohs hardness improved, but the surface layer became opaque, and therefore useless for the specific application. Similar tests were conducted with different resins like acrylic and epoxy based resins, but the test results were similar or worse.

New tests were planned in which several "micro layers" of different composite materials were applied to the surface of the composite marble stone surface, thus finally arriving to the element provided by the present invention, which is illustrated by FIG. 1 for an embodiment. Lacker roller Machinery was used in order to apply several layers of only several microns each, in this case layers 2a, 2b, 3, 4, 5 and 6.

Independent testing showed that by applying the test norm UNE EN 438-2 for scratch resistance, marble composite stone treated with surface protection layer increased from 1.7 N to 6.0 N, which means that in order to reach a visible scratch to the test peace, almost four times more pressure was needed for the protected piece as for the non-protected marble based composite.

Independent testing showed that by applying the test norm UNE 48250:1992 for abrasion resistance, marble composite stone treated with surface protection layer the amount of abrasion decreased from 106 to 56 mg/1000 cycles, which means that for the same amount of abrasion cycles applied to a protected marble composite piece, only half of the material was taken away from the test piece as for the original non-protected marble composite stone.

Tests relating to the impact absorbing performance were also realized, showing that the element provided by the invention, thanks to the intermediate layer 5, has a good impact absorbing response.

The overall conclusion is that by applying the multi layer protection coating described in this invention, wear resistance, scratch resistance and impact resistance are all improved significantly.

A person skilled in the art could introduce changes and modifications in the described embodiments, without departing from the scope of the invention as described in the enclosed claims.

The invention claimed is:

1. Reinforced natural or conglomerate stone plate shaped element comprising:
    a) a substrate of natural or conglomerate stone material; and
    b) a multi-layered coating providing protection to said substrate against chemical and wearing mechanical agents acting on the element; wherein said multi-layered coating comprises at least three single or multiple film forming composition layers including:
- an upper layer including scratch resistant nano particles embedded in a resin selected from the group consisting of polyester-, melamine-, phenolic-, acrylic-, epoxy-resins and a combination thereof, wherein the upper layer provides scratch protection;
- a cushioning intermediate layer made of epoxy and/or acrylic resin, wherein the cushioning intermediate layer provides impact resistance; and
- a lower layer adjacent said substrate including Al2O3 or silicon carbide particles plus an acrylic polymer, wherein the lower layer provides abrasion resistance.

2. The element of claim 1, wherein said scratch resistant nano particles comprise SiC, BN, B4N, alumina, or a combination thereof.

3. The element of claim 1, further comprising, between said substrate and said multi-layered coating, a primer coating for enhancing adhesion between them.

4. The element of claim 1, wherein said multilayered coating is substantially transparent.

5. The element of claim 3, further comprising, between said primer coating and said multi-layered coating, a finish or printing layer adopting a design pattern, and wherein said multi-layered coating is transparent or translucent in order to allow a visualization of said finish or printing layer.

6. The element of claim 5, further comprising, between said primer coating and said printing layer a basecoat formed by at least one painting layer with a background color for setting off said design pattern, said at least one painting layer being formed from heat drying a waterborne paint.

7. The element of claim 6, wherein said design pattern has a true wood appearance.

8. The element of claim 1, wherein each of said upper layer, said cushioning intermediate layer and said lower layer have been obtained by deposition on said substrate and then curing said multi-layer coating.

9. The element of claim 1, where each of said layer, said cushioning intermediate layer and said lower layer has a thickness or 10-30 microns and a coat weight of 20-30 g/m².

10. The element of claim 1, wherein the substrate has a surface on which said multi-layered coating is placed and the substrate has undergone a corona treatment that improves the adherence of said multi-layer coating to said substrate surface.

11. The element of claim 1, where the multi-layered coating further comprises UV stabilizers and/or anti oxidant components for providing UV protection.

12. The element of claim 1, wherein said element is a slab or a tile.

13. The element of claim 1, wherein said substrate is a recycled material conglomerate of cast stone and/or sludge.

14. The element of claim 12, wherein a thickness of said substrate is between 6 and 30 mm.

15. The element of claim 13, wherein a thickness of said substrate is between 6 and 30 mm.

16. Reinforced natural or conglomerate stone plate shaped element comprising:
a) a substrate of natural or conglomerate stone material; and
b) a multi-layered coating providing protection to said substrate against chemical and wearing mechanical agents acting on the element; wherein said multi-layered coating comprises at least three single or multiple film forming composition layers including:
- an upper layer including scratch resistant nano particles embedded in a resin selected from the group consisting of polyester-, melamine- phenolic-, acrylic-, epoxy-resins and a combination thereof, wherein the upper layer provides scratch protection;
- a cushioning intermediate layer made of epoxy and/or acrylic resin, wherein the cushioning intermediate layer provides impact resistance; and
- a lower layer adjacent said substrate including Al2O3 or silicon carbide particles plus an acrylic polymer, wherein the lower layer provides abrasion resistance
wherein said scratch resistant nanoparticles comprise a combination of SiC, BN, B4N and alumina.

17. The element of claim 16, wherein said multilayered coating is substantially transparent.

* * * * *